(12) United States Patent
Starr

(10) Patent No.: US 9,396,204 B2
(45) Date of Patent: Jul. 19, 2016

(54) DATA DEDUPLICATION IN A REMOVABLE STORAGE DEVICE

(71) Applicant: Spectra Logic Corporation, Boulder, CO (US)

(72) Inventor: Matthew Thomas Starr, Lafayette, CO (US)

(73) Assignee: Spectra Logic, Boulder, CO (US)

(*) Notice: Subject to any disclaimer, the term of this patent is extended or adjusted under 35 U.S.C. 154(b) by 451 days.

(21) Appl. No.: 13/725,088

(22) Filed: Dec. 21, 2012

(65) Prior Publication Data
US 2014/0181054 A1    Jun. 26, 2014

(51) Int. Cl.
*G06F 12/00* (2006.01)
*G06F 17/30* (2006.01)

(52) U.S. Cl.
CPC .... *G06F 17/30159* (2013.01); *G06F 17/30156* (2013.01)

(58) Field of Classification Search
CPC ............ G06F 17/30156; G06F 3/0641; G06F 17/30159
USPC ............................ 707/692; 711/103, 161, 162
See application file for complete search history.

(56) References Cited

U.S. PATENT DOCUMENTS

| | | | |
|---|---|---|---|
| 7,197,189 B2 | 3/2007 | Adelmann |
| 7,380,115 B2 | 5/2008 | Maine |
| 7,831,793 B2 | 11/2010 | Chakravarty |
| 8,028,106 B2 | 9/2011 | Bondurant |

OTHER PUBLICATIONS

Timothy E. Denehy; IBM Search Report: Duplicate Management for Reference Data http://domino.watson.ibm.com/library/cyberdig.nsf/ 1e4115aea78b6e7c85256b360066f0d4/ 9add5f942230d74585256e3500578d88!OpenDocument&Highlight=0, Content,Management.

*Primary Examiner* — Matthew Bradley
(74) *Attorney, Agent, or Firm* — Kenneth Altshuler

(57) ABSTRACT

An apparatus and associated methodology contemplate a data storage system having a removable storage device operably transferring user data between the data storage system and another device via execution of a plurality of input/output commands. A commonality factoring module executes computer instructions stored in memory to assign commonality information to the user data. A deduplication module executes computer instructions stored in memory to combine a plurality of files of the user data (user data files) with at least one file of corresponding commonality information (commonality information file), the combined files forming a sequential data stream.

1 Claim, 17 Drawing Sheets

DATA DEDUPLICATION IN A REMOVABLE STORAGE DEVICE

CROSS-REFERENCE TO RELATED APPLICATIONS

None.

BACKGROUND

The present embodiments relate generally to digital data storage, and more particularly but without limitation to data deduplication in a removable storage device.

DESCRIPTION OF RELATED ART

The combination of multiple storage devices into large capacity data storage systems has proliferated in response to market demands for storing enormous amounts of data that can be readily retrieved in a fast, reliable, and efficient manner.

With continued demands for ever increased levels of storage capacity and data transfer throughput performance, there remains an ongoing need for improvements in the manner in which the storage devices are operationally managed in order to optimize the capacity and data throughput performance while minimizing storage expense. It is to these and other related improvements that embodiments of the present invention are directed.

SUMMARY

Some embodiments of the present invention contemplate a data storage system having a removable storage device operably transferring user data between the data storage system and another device via execution of a plurality of input/output commands. A commonality factoring module executes computer instructions stored in memory to assign commonality information to the user data. A deduplication module executes computer instructions stored in memory to combine a plurality of files of the user data (user data files) with at least one file of corresponding commonality information (commonality information file), the combined files forming a sequential data stream.

Some embodiments of the present invention contemplate a method including: obtaining a data storage system having a removable storage device; transferring data between the data storage system and another device via execution of a plurality of input/output commands; performing commonality factoring to assign commonality information to a data pattern in the transferred data; and deduplicating the user data by combining a plurality of files of the user data (user data files) with at least one file of corresponding commonality information (commonality information file) into a sequential data stream.

Some embodiments of the present invention contemplate a data storage library having a frame and a shelf system supported by the frame to queue a plurality of tape cartridges. Each of a plurality of tape drives is adapted to engage one of the tape cartridges at a time in a data transfer relationship. A transport system selectively moves the tape cartridges between the queue in the shelf system and the data transfer relationship in one of the plurality of tape drives. A controller selectively accesses instructions stored in memory that when executed deduplicate the user data by interleaving a plurality of files of the user data (user data files) with a respective plurality of files of corresponding commonality information (commonality information files) into a sequential data stream.

DETAILED DESCRIPTION

Initially, this disclosure is by way of example only, not by limitation. The data transfer concepts herein are not limited to use or application with any specific system or method for using storage devices. Thus, although the instrumentalities described herein are for the convenience of explanation, shown and described with respect to exemplary embodiments, it will be appreciated that the principles herein may be applied equally in other types of storage systems and methods involving the storage and retrieval of data.

Figure 1:
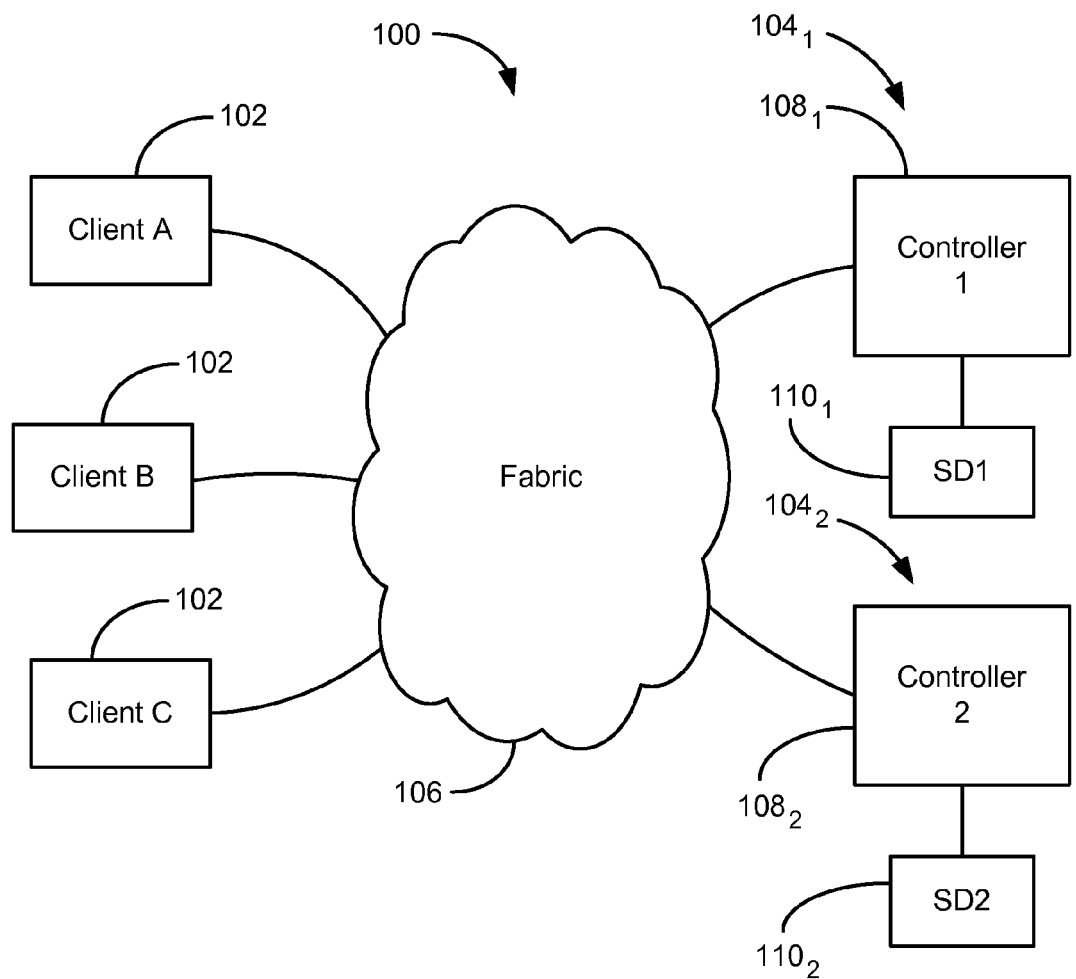
FIG. 1 is a functional block depiction of a distributed storage system utilizing a storage device array that is constructed in accordance with embodiments of the present invention.

To illustrate an exemplary environment in which preferred embodiments of the present invention can be practiced, FIG. 1 shows a distributed data storage system 100 providing a storage area network (SAN) utilizing mass storage. The system 100 includes a number of processing client devices 102, respectively identified as clients A, B, and C. The clients 102 can interact with each other as well as with a pair of data storage arrays 104 via a fabric 106. The fabric 106 is preferably characterized as Ethernet, although other configurations can be utilized as well, such as the Internet, fibre channel, and Infiniband. Data is transferred between the clients 102 and the storage arrays 104 by executing input/output (I/O) transfers. Generally, an I/O transfer can originate from either a client 102 or a storage array 104 to store data to or retrieve previously stored data from a storage array 104.

Each storage array 104 includes one or more controllers 108 and a set of data storage devices (SDs) 110. It is further contemplated that in some embodiments the A client 102 and the data storage array $104_1$ can be physically located at a first site, the B client 102 and storage array $104_2$ can be physically located at a second site, and the C client 102 can be yet at a third site, although such is merely illustrative and not limiting.

Figure 2:
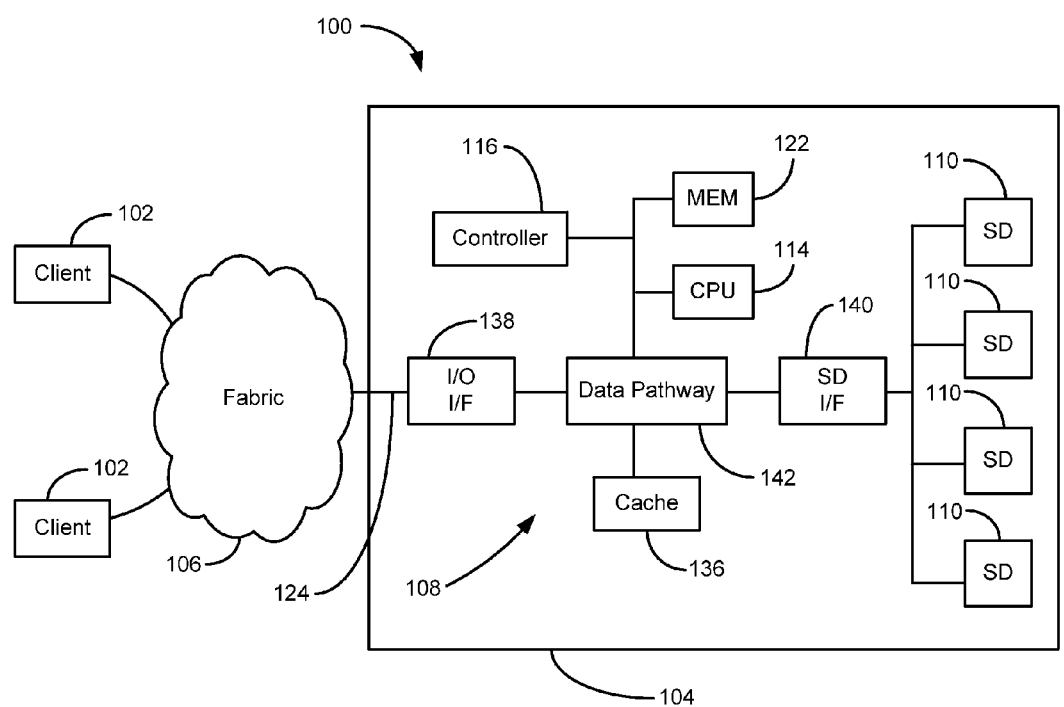
FIG. 2 is a functional block depiction of a portion of the storage device array of FIG. 1.

FIG. 2 diagrammatically depicts illustrative embodiments of the data storage system 100 in which one of the storage arrays 104 is connected to the clients 102 to transfer user data with a number of SDs 110. The user data is transferred by executing I/O transfers via the switchable fabric 106. The SDs 110 may be removable media drives, such as tape drives and tape cartridges used for purposes of the detailed description below. In illustrative embodiments a plurality of tape cartridges (see below) can redundantly store data (Redundant Array of Independent Tapes) even though not all of the plurality of tape cartridges are simultaneously mounted in a tape drive for I/O transfers.

For purposes of this description and meaning of the claimed subject matter the term "user data" means data that is transferred to the storage array 104 and that is retrieved from the storage array 104 as the result of client 102 activities. For example, the client 102 can be a computational device with a user interface permitting the user to either store information (such as a document, spreadsheet, drawing, and the like), or to retrieve such previously stored information. The computer system also handles non-file object-oriented programming language structures such as inodes. During a transfer the user data may be accompanied by non-user data, sometimes referred to as metadata, that provides system information for properly routing and processing the user data in order to reliably store and retrieve it. The metadata informs the data storage system of pertinent details such as what type of data format is being transferred, the file name, redundancy identifiers, and the like.

Each of the remote clients 102 may view the entire physical storage capacity (via the SDs 110) of the storage array 104 as a unified storage space. The storage array 104, the client 102, or a network appliance (not shown) virtualizes the physical storage space to a logical addressing nomenclature. The storage array 104 also buffers data being transferred between the clients 102 and the SDs 110 to optimize I/O throughput performance. For example, writeback commands may be employed that temporarily store user data and acknowledge the write as being complete before that user data is actually transferred to the SDs 110. The storage array 104 can also employ predetermined fault tolerance arrangements in which parallel, redundant links store at least some of the user data so that a redundant copy of the user data can be retrieved or reconstructed in the event that the primary copy of the user data becomes unavailable.

The circuitries represented by the functional block depiction in FIG. 2 and otherwise throughout this description generally can be embodied in a single integrated circuit or can be distributed among a number of discrete circuits as desired. In these illustrative embodiments, a main processor (CPU) 114, preferably characterized as a programmable computer processor, provides top-level control in accordance with programming steps and processing data stored in non-volatile memory (such as flash memory or similar) and in dynamic random access memory (DRAM). The CPU 114 may be any processing circuit capable of executing computer instructions, such as an embedded microprocessor, a microcontroller, a state-machine, a digital signal processor (DSP), and the like. Furthermore, the CPU 114 may have multiple core processing elements functioning simultaneously and independently of each other.

A controller 116 enhances the data throughput efficiency by performing deduplication, reducing the occurrence of repeatedly storing the same data. For example, a data file or object that is already stored in memory might be updated to revise only a small portion of it. In that case data throughput capability may be improved by storing only the updated part of the data instead of the entire updated data because most of the entire updated data is already stored.

An I/O interface 138 provides signal conditioning and buffering for the CPU 114 and the controller 116 for signal transmissions with the network 106. The I/O interface 138 can include application specific drivers and logic to support communications via the network 106, such as PCI, Ethernet, inter-integrated circuit ($I^2C$), universal serial bus (USB), IEEE-1394 (FireWire), control area network bus (CAN), proprietary network or bus formats, and the like.

Figure 3:
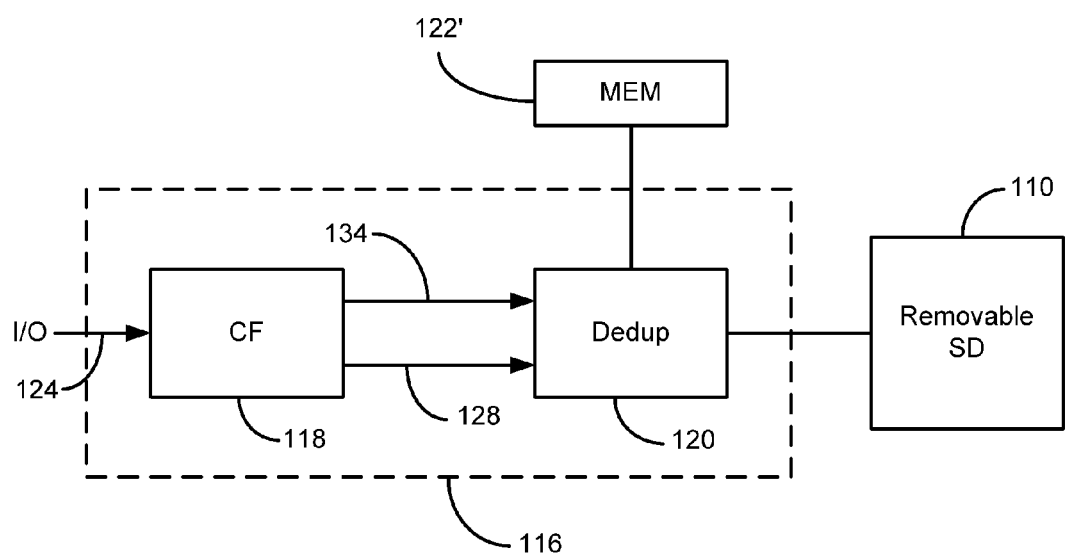
FIG. 3 is a functional block depiction of portions of the storage device array of FIG. 2.

FIG. 3 is a functional block depiction of the controller 116 which includes a commonality factoring (CF) module 118 and a deduplication (Dedup) module 120. The controller 116 accesses a low latency memory (MEM) 122' and the SDs 110. Preferably the SD 110 is a removable device. In the illustrative embodiments below, for example, the removable SD 110 is a tape cartridge in a tape library data storage system.

The CF module 118 can be hardware and/or software executing computer programming instructions to segment the I/O stream 124 into manageable portions for the purpose of deduplication. For example, the CF module 118 may be executed via a computing system such as a microprocessor or a macroprocessor residing in a computer and processing computer instructions stored in a solid state memory or a moving media memory.

Figure 4:
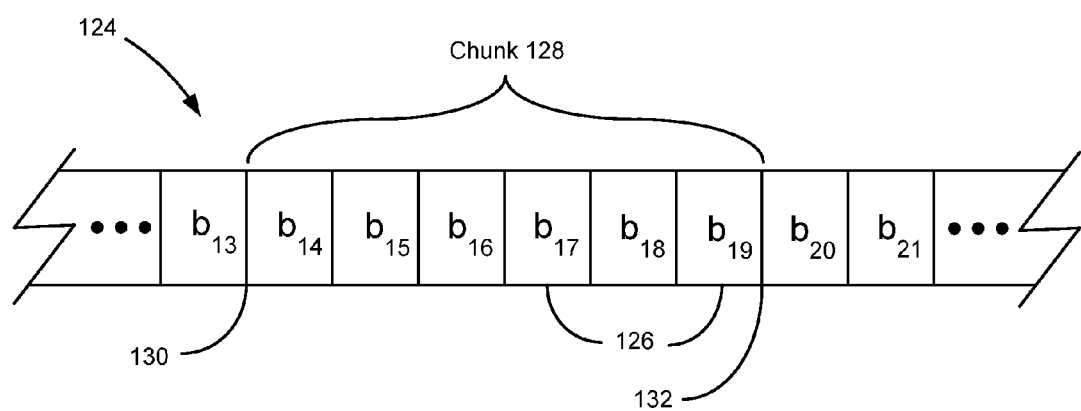
FIG. 4 diagrammatically depicts the I/O stream of user data in the distributed storage system of FIG. 1.

FIG. 4 diagrammatically depicts a plurality of segmented same-size data blocks 126 forming the I/O stream 124. The CF module 118 groups the data blocks 126 into data chunks 128. In this example the data chunk 128 is formed of six data blocks $126_{b14-b19}$ extending between data chunk boundaries 130, 132. The fact that the boundaries 130, 132 coincide with data block 126 boundaries is merely illustrative. In alternative embodiments the boundaries 130, 132 can divide the respective data blocks 126.

The data chunks 128 can be formed by a fixed number of data blocks 126 (fixed-size) or by a variable number of data blocks 126 (variable-size). All computation, transfer, and storage metrics are optimized around the predetermined (constant) size of each data chunk 128. However, using fixed-size data chunks 128 may be rendered ineffective by small amendments to comparably large data files/objects. That is, appending data to a previously stored data pattern (such as may occur with a file update) may cause an offset in the new data pattern in comparison to the previously stored data pattern, making the commonality of the two patterns indiscernible to the CF module 118. For example, consider the following I/O stream as it was originally formed by the CF module 118 with three fixed-size data chunks 128; the first data chunk 128 containing data blocks denoted 1 2 3 4, the second data chunk 128 containing data blocks denoted 5 6 7 8, and the third data chunk 128 containing data blocks denoted 9 10 11 12:

| | | | |
|---|---|---|---|
| 1 2 3 4 | 5 6 7 8 | 9 10 11 12 | (first I/O stream) |

If that stored data is subsequently amended to add data block 13 at the beginning, then the fixed-size data chunks 128 become:

| | | | |
|---|---|---|---|
| 13 1 2 3 | 4 5 6 7 | 8 9 10 11 | (amended I/O stream) |

Despite the fact that most of the data pattern sequence in the amended I/O stream is the same as the first I/O stream, forming fixed-size data chunks 128 typically does not discern that data pattern sequence downstream of where new data is added.

That disadvantage can be remedied by using variable-size data chunks 128 to form the I/O stream according to boundaries defined by the data content, not size. The boundaries are empirically derived by comparing a plurality of different distributions of the data taken in a sliding window of the I/O stream. For example, fingerprints or checksums may be generated within a predefined window of the I/O stream 124, wherein one or more newest bytes continually replace the like number of oldest bytes. Lookup tables may be employed to shorten complicated calculation algorithms generating the comparative snapshots. Applying variable-size data chunks 128 to the example above demonstrates the improved capability in discerning at least some redundancy in the previously stored data:

| | | | |
|---|---|---|---|
| 1 2 3 4 | 5 6 7 8 | 9 10 11 12 | (first I/O stream) |
| 13 1 2 3 4 | 5 6 7 8 | 9 10 11 12 | (amended I/O stream) |

Returning to FIG. 3, ultimately the CF module 118 outputs a sequence of data chunks 128 along with identification information generally referred to herein as a commonality function (CF) tag 134 uniquely identifying each data chunk 128. The CF tag information is also referred to herein as "commonality information" and depicted by C. In alternative embodiments mentioned above where the data chunk 128 boundaries may not coincide with the data block 126 boundaries, the CF module 118 can also mark each data chunk 128 with a file mark (not depicted) and an end-of-file mark (not depicted) for synchronizing the processing of the data chunks 128 during the I/O transfers.

The CF tag 134 quantifies each data chunk 128 in terms of the sequence of the data bytes in the respective data blocks 126. For illustrative purposes of this description the CF tag 134 can be a cryptographic hash function such as a message digest algorithm (MDA) or a secure hash algorithm (SHA). However, the contemplated embodiments of the present invention are not limited in that in equivalent alternative embodiments the CF tag 134 can be other types of quantifiable identifiers such as Rabin fingerprinting and the like.

The CF tag 134 summarizes the content of the data in the data chunk 128. Thus, for two data chunks 128 having the same data content the deduplication module 120 will generate the same CF tag 134. Two CF tags 134 can be computationally compared significantly faster than a byte-by-byte comparison of the two corresponding sets of data blocks 126 forming the data chunks 128. Two or more CF tags 134 are compared to determine whether the I/O stream 124 includes a write for a data chunk 128 that has already been stored in a particular SD 110. The second write can be replaced by pointing to the already existing data chunk 128 instead of writing that data chunk 128 again. The chance that two different data chunks 128 generate the same CF tag 134, called a data collision, is rendered an insignificant risk by selecting an appropriate commonality factoring algorithm.

The data chunks 128 and corresponding CF tags 134 are received by the deduplication module 120, which determines whether the data chunk 128 corresponding to each CF tag 134 is already stored in the removable SD 110.

Returning to FIG. 2, the cache 136 temporarily stores unexecuted I/O transfers of user data until such a time that they are executed. A control memory 122 stores system information and instructions. Examples of a control memory device 122 include solid state memory devices, magnetic disk drives, rotating memory devices, general random access memory devices, and the like. Certain embodiments contemplate the control memory device 122 providing system data transfers at a significantly faster rate than the user data transfers with the SDs 110.

The I/O interface 138, an SD interface 140, and data pathway logic 142 form a pass-through communication path for commands and data between the SDs 110 and the client(s) 102. Again, although illustrated discretely, the pathway logic 142 and the I/F circuits 138, 140 can be unitarily constructed.

Figure 5:
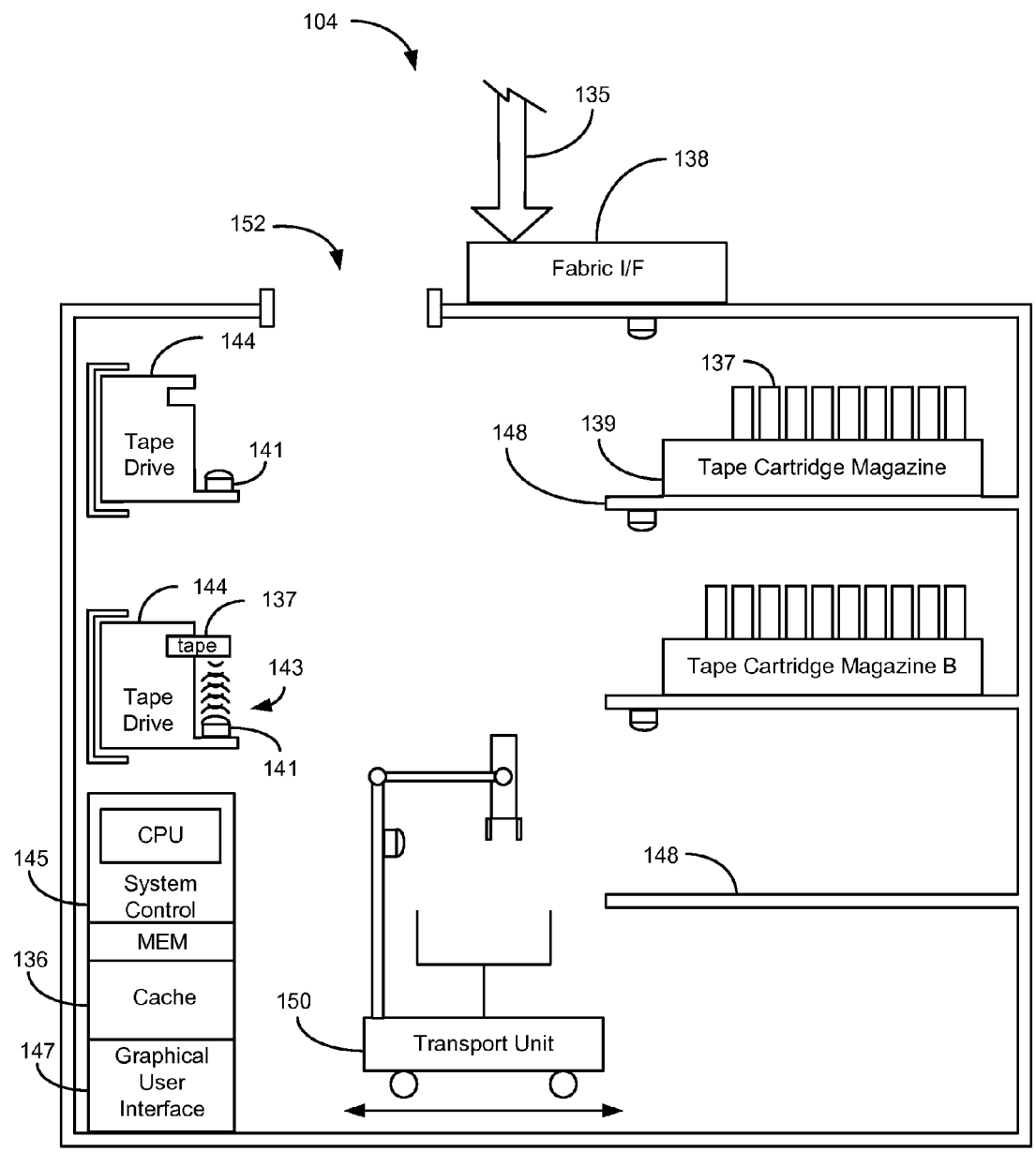
FIG. 5 is a diagrammatical depiction of the storage device array of FIG. 1 constructed in the form of a tape library.

FIG. 5 diagrammatically depicts the storage array 104 constructed as a tape library for purposes of this illustrative description. External communications for the I/O transfers are performed via the fabric interface 138 coupled to a communications link 135. The number and arrangement of the various components depicted in FIG. 5 are merely illustrative and in no way limiting of the claimed invention. The tape library has a plurality of tape cartridges 137 grouped in magazines 139. Each of the tape cartridges 137 is identifiable, such as by radio frequency identification (RFID) tags or semiconductor memory devices and the like, for selectively loading a desired one of the tape cartridges 137 into one of a plurality of tape drives 144. For purposes of this illustrative example the SD 110 (such as 110 in FIG. 2) is the operable combination of one of the tape cartridges 137 mounted in one of the tape drives 144. The removable SD 110 (such as in FIG. 3) more particularly refers to the fact that the data recording media (in this example the tape cartridge 137) is selectively removable from the device communicating the I/O transfer (in this example the tape drive 144). However, these described embodiments are merely illustrative and not limiting of the claimed embodiments. For example, in equivalent alternative embodiments the removable SD 110 can be other types of removable SDs, such as hard disc drives, solid state drives, optical drives, and the like.

Each of the tape cartridges 137 is selectively mounted into one of the tape drives 144 to establish a data transfer relationship to store data to and/or retrieve data from the tape cartridge 137. Each tape drive 144 can have a MAM reader/writer 141 to store data to and/or retrieve data from a MAM device 158 (FIG. 6) in the tape cartridge 137. In these illustrative embodiments the tape drive 144 establishes wireless communications 143 with the MAM reader/writer 141, such as by radio frequency communication. The MAM reader/writer 141 may read and write access occurrence data such as timestamp data indicating when the tape cartridge 137 is mounted to a tape drive 144, load count data indicating how long a tape cartridge 137 is mounted to the tape drive 144, validity data indicating any data and/or portions of the media in a tape cartridge 137 of questionable integrity, and the like. A system control 145 may include memory (MEM) to accommodate storing this information from each of a plurality of MAM writer/readers 141. Computational routines on the data retrieved by the MAM writer/reader 141 and stored in the system control memory can be under the top-level control of the system control 145. A graphical user interface (GUI) 147 provides tabular and graphical information to a user of the tape library, facilitating inputs to the storage array 104 and receiving outputs from the storage array 104.

The tape library may have a shelving system 148 for processor-controlled archiving of the magazines 139 within the tape library. The magazines 139, and the tape cartridges 137 individually, are in a queue functional state while stored in the shelving system 148. The term "queue" for purposes of this description and meaning of the claims generally means a "wait functional state." A transport unit 150 shuttles magazines 139 between the shelving system 148 and the tape drives 144, and picks and places a particular tape cartridge 137 to mount/dismount the tape cartridge 137 to/from a selected tape drive 144. A tape cartridge 137 is in a data transfer relationship functional state when mounted in one of the tape drives 144.

Again, although FIG. 5 diagrammatically depicts two magazines 139 of eleven tape cartridges 137 each being shuttled to and from two tape drives 144, that arrangement is merely illustrative and in no way limiting of the claimed embodiments. In any event, a desired number of tape drives 144 can be provided within the tape library to concurrently access a corresponding number of tape cartridges 137. The tape library is not necessarily limited to using a fixed number of tape cartridges 137. Rather, an access port 152 cooperates with an external transport system (not shown) to shuttle a magazine 139 to another tape drive (not shown), such as in another tape library (not shown).

Top-level control is provided by the system control 145 in communication with all the various components via a computer area network (not shown). Data, virtual mappings, executable computer instructions, operating systems, applications, and the like are stored to the system control 145 and accessed by one or more processors under the control of the system control 145. The system control 145 includes macroprocessors, microprocessors, memory, and the like to logically carry out software and hardware algorithms and instructions.

FIG. 5 diagrammatically depicts only major elements of the tape library for purposes of simplicity. As such, certain structures and components for the aforementioned elements to properly function are omitted because an enumeration of all such details is not necessary for the skilled artisan to readily ascertain the disclosure of this description in support of the scope of the claimed invention. For example, it will be understood that the tape library includes all of the necessary wiring, user interfaces, plugs, modular components, entry and exit port(s) to introduce (or remove) removable storage elements, fault protectors, power supplies, processors, busses, robotic transport unit tracks, indication lights, and so on, in order to carry out the function of the tape library.

Figure 6:
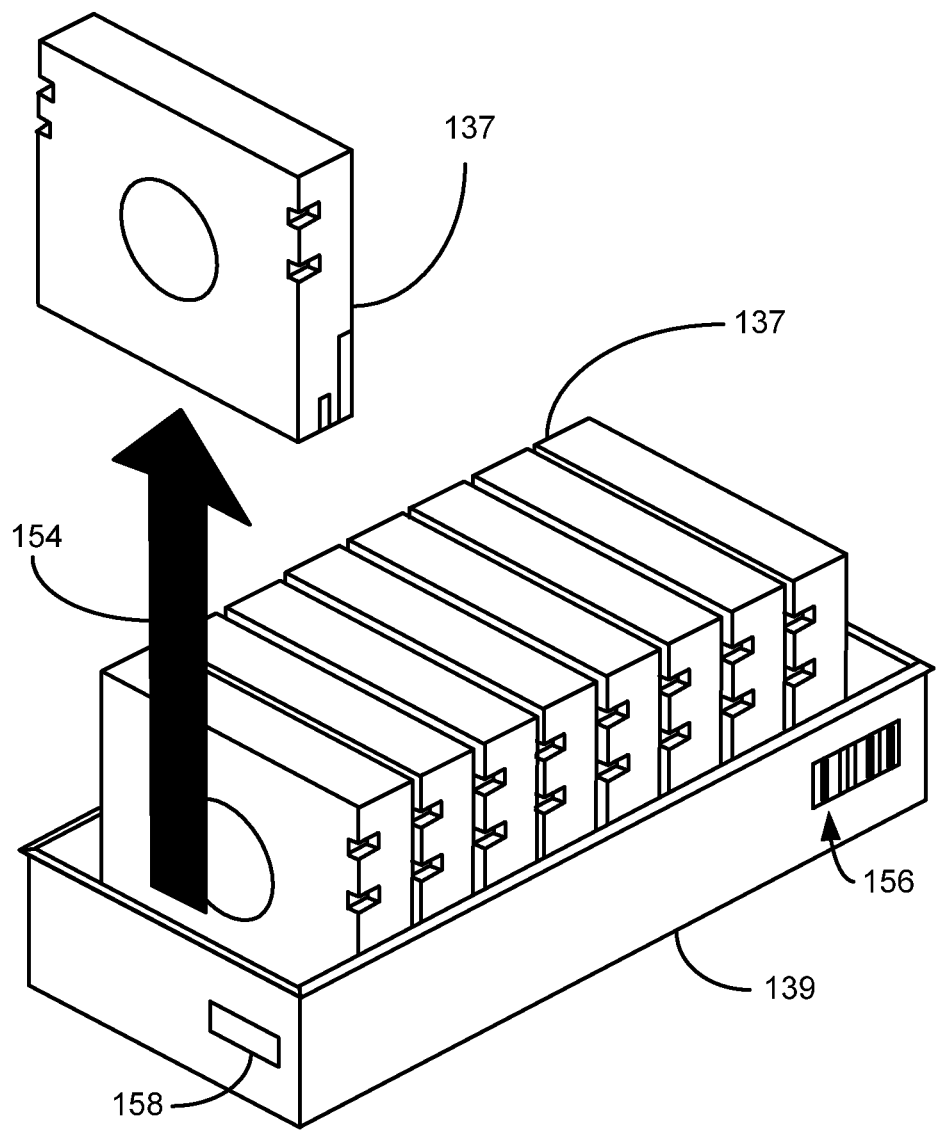
FIG. 6 is an isometric depiction of one of the magazines with tape cartridges in the tape library of FIG. 5.

FIG. 6 depicts the tape cartridges 137 supported for storage and transit by the magazine 139. In more detail, the tape cartridge 137, such as an LTO-5 or LTO-6 (generally "LTO") category tape cartridge manufactured by IBM, of Armonk, N.Y., employs magnetic tape that stores digital data written by the tape drive 144 (FIG. 5). The magazine 139 may be populated with a plurality of the tape cartridges 137, each of which may be removed upwardly by the transport unit 150 (FIG. 5), in the direction of arrow 154, then mounted to the tape drive 144. An indicia such as a bar code identification tag 156 is one way of identifying the magazine 139. Additionally, these embodiments depict a MAM device 158 attached to the magazine 139 and associated with one or more of the tape cartridges 137 residing in the magazine 139. As discussed above, the MAM device 158 may be attached to the tape cartridge 137. The MAM device 158 may be a passive device that is energized when subjected to a sufficiently strong radio frequency field generated by the MAM writer/reader 141 (FIG. 5).

Turning now to FIGS. 7-16 that diagrammatically depict steps performed by the controller 116 in executing I/O transfers to store user data to the tape cartridges 137. Again, in this description and claims "user data" means data that is stored in user data files in the SD $110_1$, such as a computer-readable data file or an object-oriented programming language structure and the like.

Figure 7:
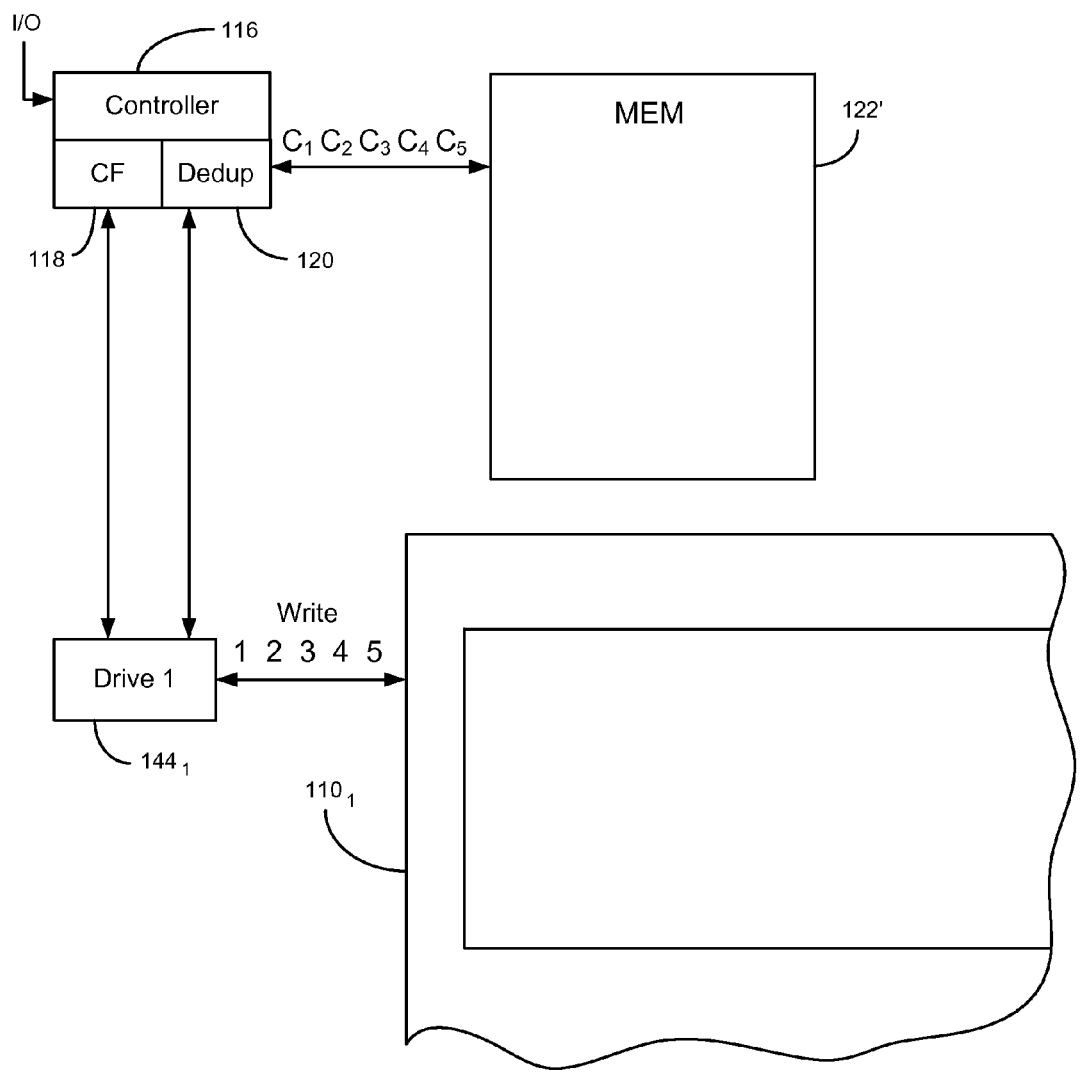
FIG. 7 diagrammatically depicts the controller executing a write command for data chunks 1 2 3 4 5.

FIG. 7 begins an example of executing these I/O transfers by the controller 116 executing a write command for five data chunks 128 labeled 1 2 3 4 5. Reiterating, the five unique data chunk labels means that the CF module 118 previously determined that each of these five data chunks 128 is unique. If the CF module 118 subsequently detects the data chunk labeled 1 again in the I/O stream 124 (FIG. 4), the CF module 118 assigns the same data chunk label 1. For simplicity sake the data chunks 128 are labeled 1 2 3 4 5 to depict both the write command to the SD $110_1$ and the stored data in the SD $110_1$. The CF module 118 also generates the corresponding CF tags 134 that are labeled $C_1$ $C_2$ $C_3$ $C_4$ $C_5$, respectively.

The controller 116 searches (such as by indexing) the memory 122' for each CF tag 134 ($C_1, C_2, C_3, C_4, C_5$) before executing the write command. At the beginning of this example there are no CF tags 134 stored in the memory 122', so a miss is returned for each search. As discussed below, CF tags 134 can be stored in the memory 122' using one or more data structures such as a binary tree, an indexed list, and an indexed binary tree.

Figure 8:
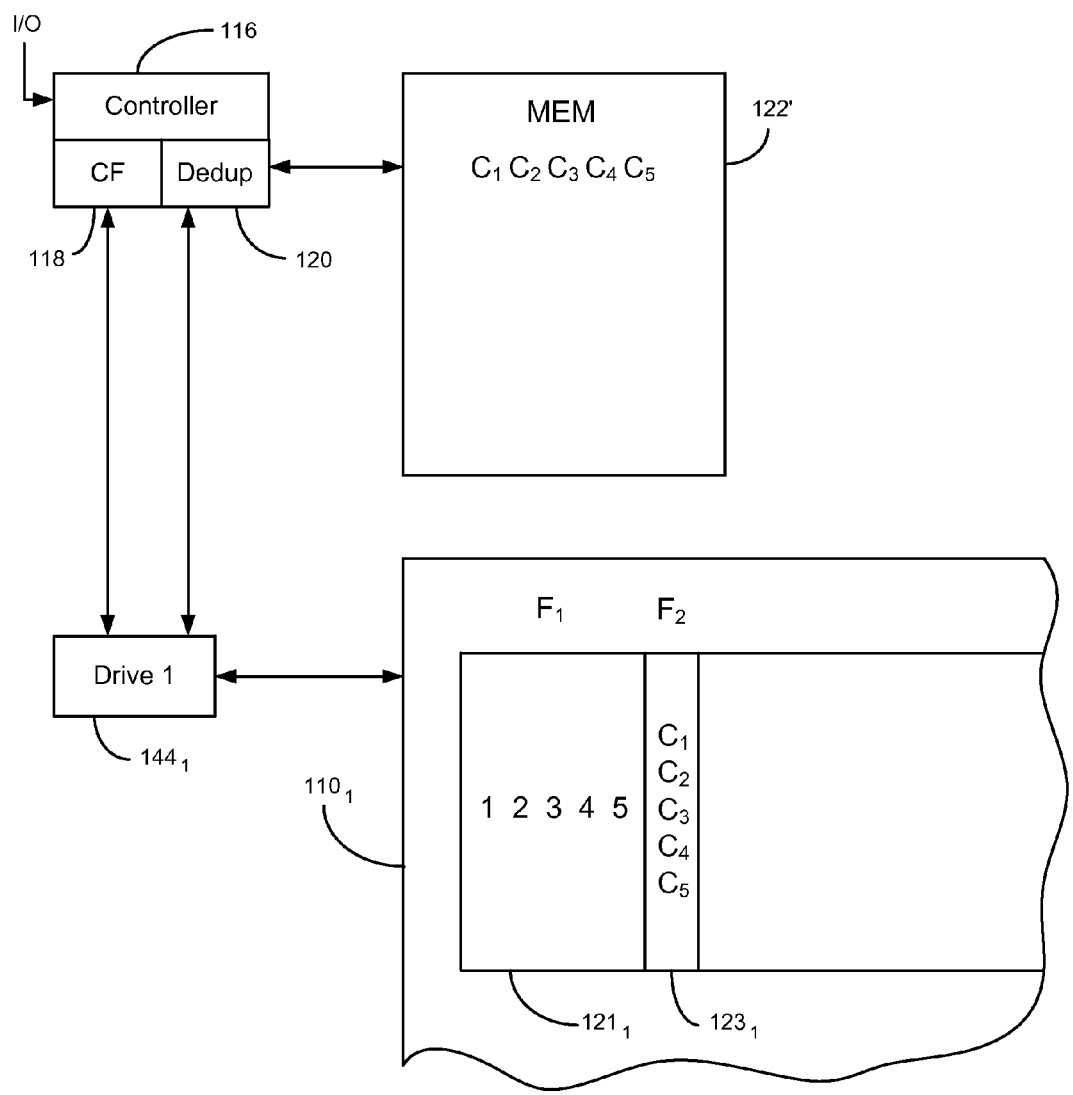
FIG. 8 is similar to FIG. 7 but depicting a time after the write command is completed.

From the misses the controller 116 determines that, at the time of receiving the write command for 1 2 3 4 5, none of the $C_1$ $C_2$ $C_3$ $C_4$ $C_5$ corresponding to the write command 1 2 3 4 5 are stored in the memory 122'. Consequently, FIG. 8 depicts the controller 116 writing $C_1$ $C_2$ $C_3$ $C_4$ $C_5$ to the memory 122' and storing 1 2 3 4 5 in a first file ($F_1$) $121_1$ in the SD $110_1$. The controller 116 also writes $C_1$ $C_2$ $C_3$ $C_4$ $C_5$ in a sequential second file ($F_2$) $123_1$ in the SD $110_1$. In this description and claims the first file 121 containing 1 2 3 4 5 is termed a "user data file," and the second file 123 containing $C_1$ $C_2$ $C_3$ $C_4$ $C_5$ is termed a "commonality information file."

The diagrammatic depictions are simplified by not including metadata that accompanies each of the files. For example, each file may include a file marker and an end-of-file marker, indicating to the controller 116 the beginning and ending of that file, respectively. Each file can be divided into a number of records, with record markers demarcating the beginning each record. For example, each of the data chunks 128 (1 2 3 4 5) may be stored as individual records in the user data file $121_1$. In this example, the controller 116 may individually access any of the data chunks 128 (1 2 3 4 5) by scrolling the tape until the corresponding file is found, and then scrolling some more to find the corresponding record within the file. The CF tags 134 ($C_1$ $C_2$ $C_3$ $C_4$ $C_5$) may be stored in a similar manner, either individually or grouped in one or more records in the commonality information file $123_1$.

Figure 9:
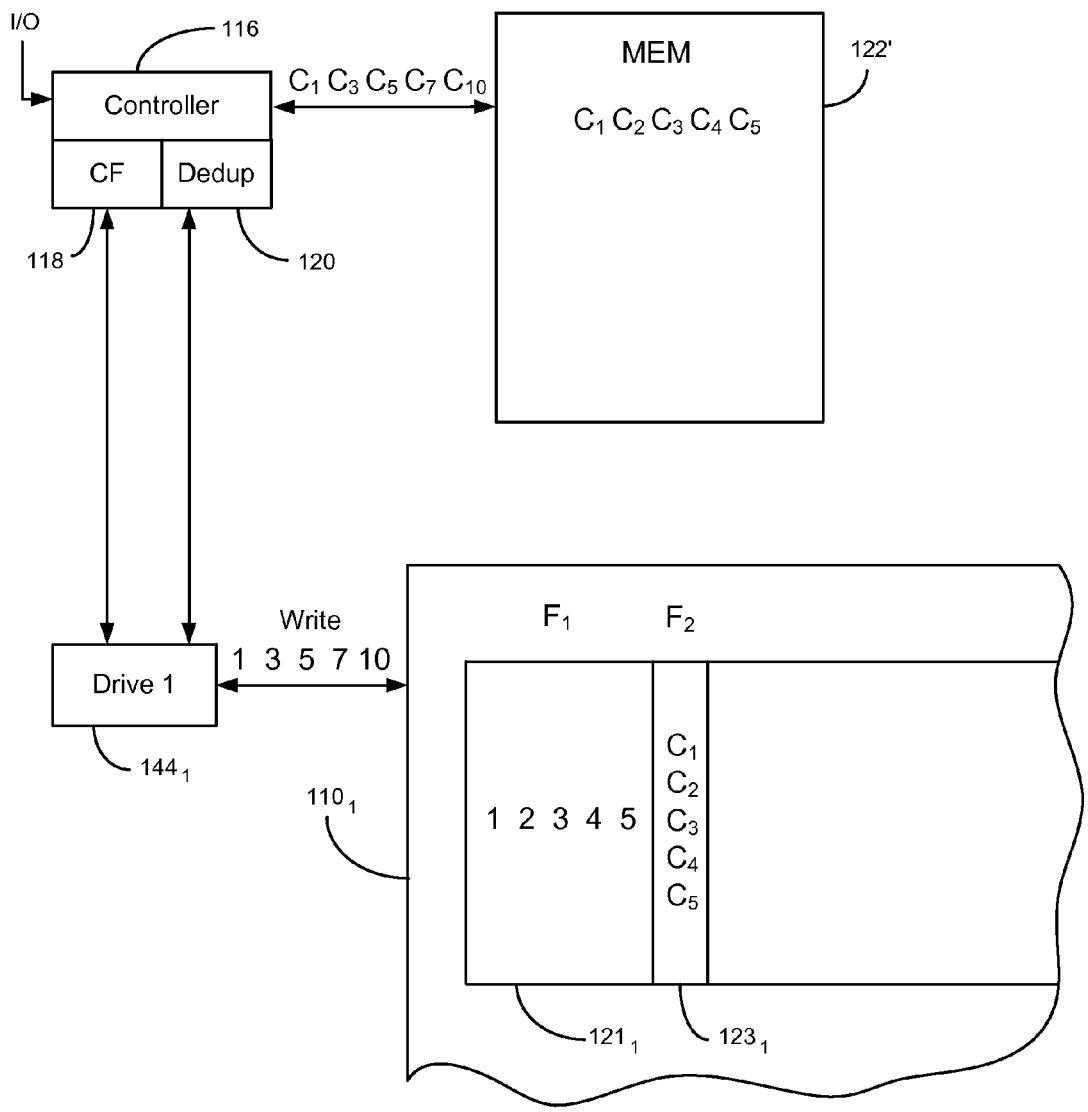
FIG. 9 is similar to FIG. 8 but depicting the controller executing a subsequent write command for data chunks 1 3 5 7 10.
Figure 10:
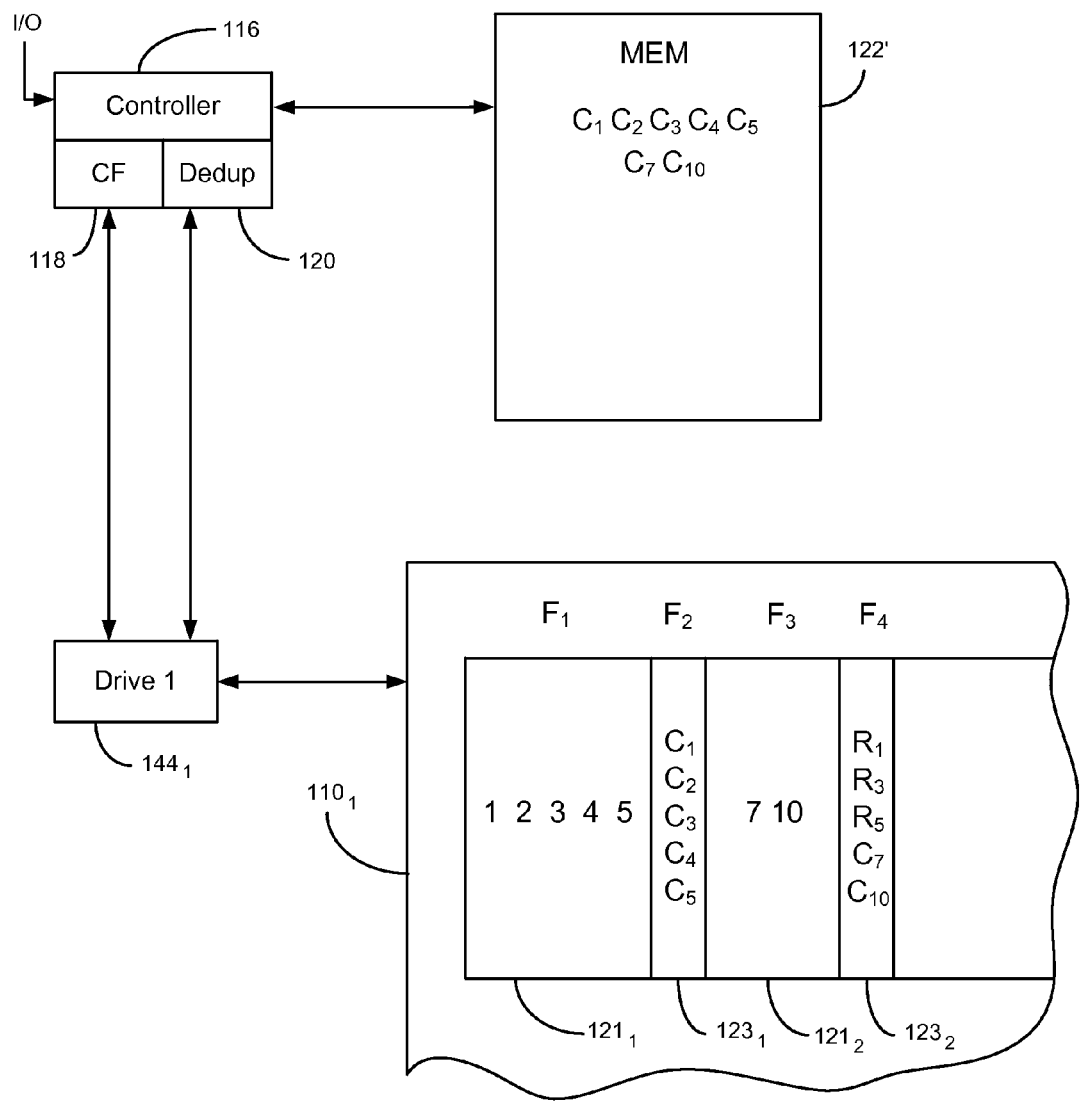
FIG. 10 is similar to FIG. 9 but depicting a time after the write command is completed.

FIG. 9 depicts the controller 116 directing a subsequent write command for 1 3 5 7 10. From searching the memory 122' the controller 116 gets hits for only $C_1$ $C_3$ $C_5$, indicating that 1 3 5 are already stored in the SD $110_1$. FIG. 10 depicts the controller 116 storing only 7 10 in a second user data file $121_2$ (depicted as the third sequential file $F_3$) because 7 10 are the only data chunks 128 for this write command that are not stored in the upstream user data file $121_1$. Deduplication is accomplished by not storing 1 3 5 in both the first user data file $121_1$ and the second user data file $121_2$.

Responsive to the hit when searching the memory 122' for $C_1$, the controller 116 responsively writes a reference $R_1$ to the second commonality information file $123_2$. $R_1$ is a data structure that points to 1 already stored in the first user data file $121_1$. In a subsequent read command of $F_3$, $R_1$ may instruct the controller 116 to retrieve 1 by scrolling to find the file marker for the first user data file $121_1$ and then scrolling further to the first record in the first user data file $121_1$. The controller 116 likewise writes references $R_3$, $R_5$ corresponding to 3 5 previously stored in the third and fifth records, respectively, of $F_1$ (the first user data file 1210.

From the misses when searching the memory 122' for $C_7$ and $C_{10}$, the controller 116 responsively writes 7 10 to the second user data file $121_2$ and writes $C_7$ $C_{10}$ to the memory 122' and to the second commonality information file $123_2$. The data array 104 is programmed to ascertain that a $C_i$ stored in some commonality information file 123 corresponds to a data chunk 128 in the upstream sequential user data file 121. An $R_i$ stored in some commonality information file 123 can correspond to a data chunk 128 in any designated upstream user data file 121.

Momentarily departing from the I/O execution example, with this sequential arrangement of user data files 121 and commonality information files 123 an I/O command to read a stored file may be executed by first accessing the commonality information for that stored file. For example, an I/O command to read the third sequential file $F_3$ (the second user data file $121_2$) may be executed by scrolling the tape to the end-of-file mark for $F_3$, and then reading all of the data to the end-of-file mark for $F_4$ (the second commonality information file $123_2$). $R_1$ $R_3$ $R_5$ in the content of $F_4$ inform the controller 116 that in order to retrieve $F_3$ (1 3 5 7 10) it must read 1 3 5 from the first, third, and fifth records of $F_1$ (user data file $121_1$). $C_7$ $C_{10}$ in the content of $F_4$ inform the controller 116 that in order to retrieve $F_3$ (1 3 5 7 10) it must also read 7 10 from the first and second records of $F_3$ (user data file $121_2$).

Returning to the I/O execution example, at this point it will be apparent that the deduplication module 120 executes computer instructions to form a sequential string of a plurality of the user data files $121_1$, $121_2$ . . . $121_n$ with a respective plurality of corresponding commonality information files $123_1$, $123_2$ . . . $123_n$. In these particular embodiments that sequential string interleaves the user data files 121 and the commonality information files 123. Generally, any user data file 121 contains only those data chunks 128 that are not stored in an upstream user data file 121. The corresponding commonality information file 123 may contain a $C_i$ for a data chunk 128 stored in the upstream sequential user data file 121, and/or may contain an $R_i$ for a data chunk 128 stored in an upstream nonsequential user data file 121.

Figure 11:
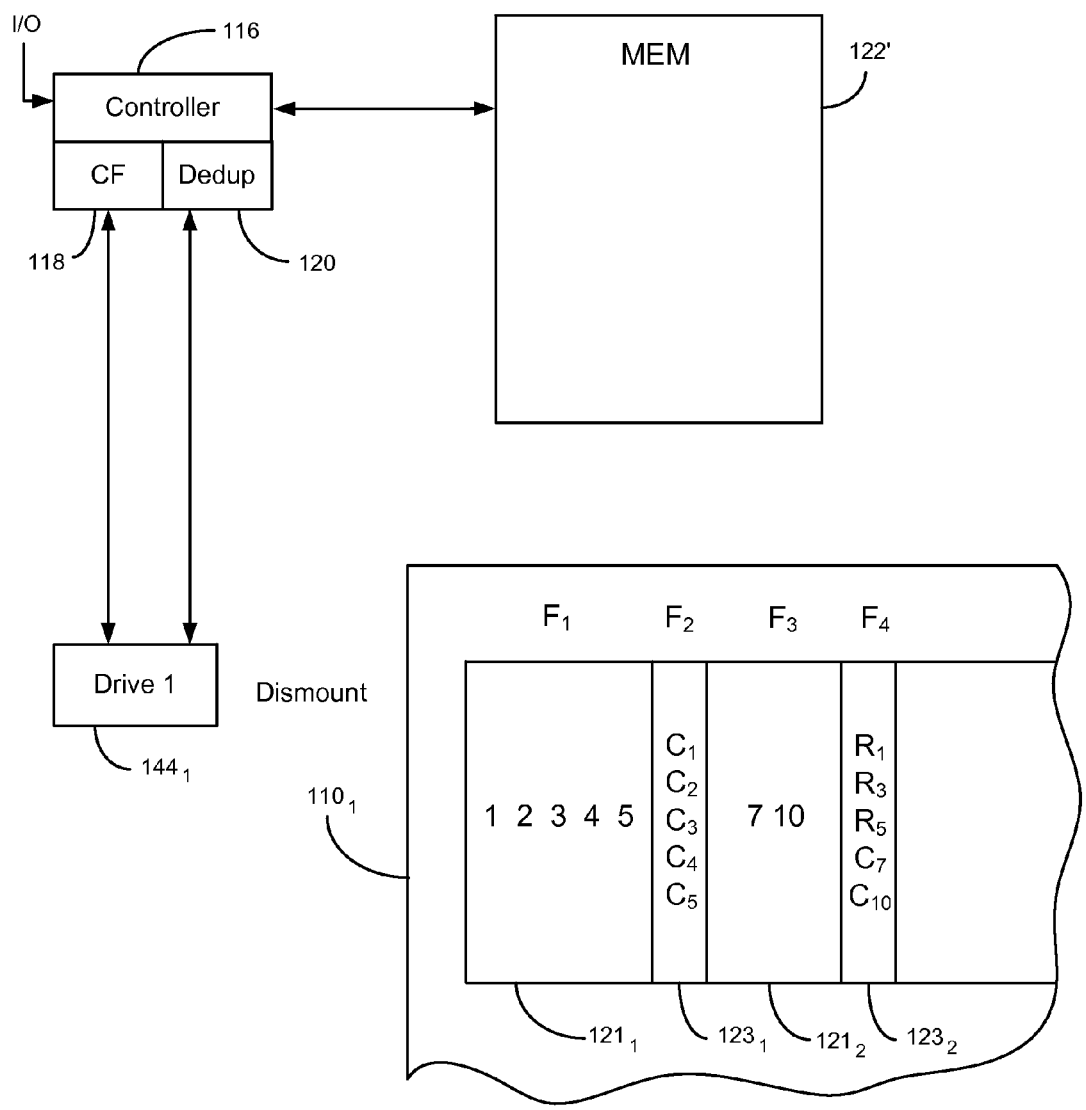
FIG. 11 is similar to FIG. 10 but depicting the controller dismounting the tape cartridge from the first tape drive.

When all I/O transfers are complete for the SD $110_1$, FIG. 11 depicts the controller 116 dismounting the SD $110_1$ from the drive $144_1$ (Drive 1). The memory 122' is cleared to make ready for I/O transfers with the next SD 110, that will be mounted to the drive $144_1$.

Figure 12:
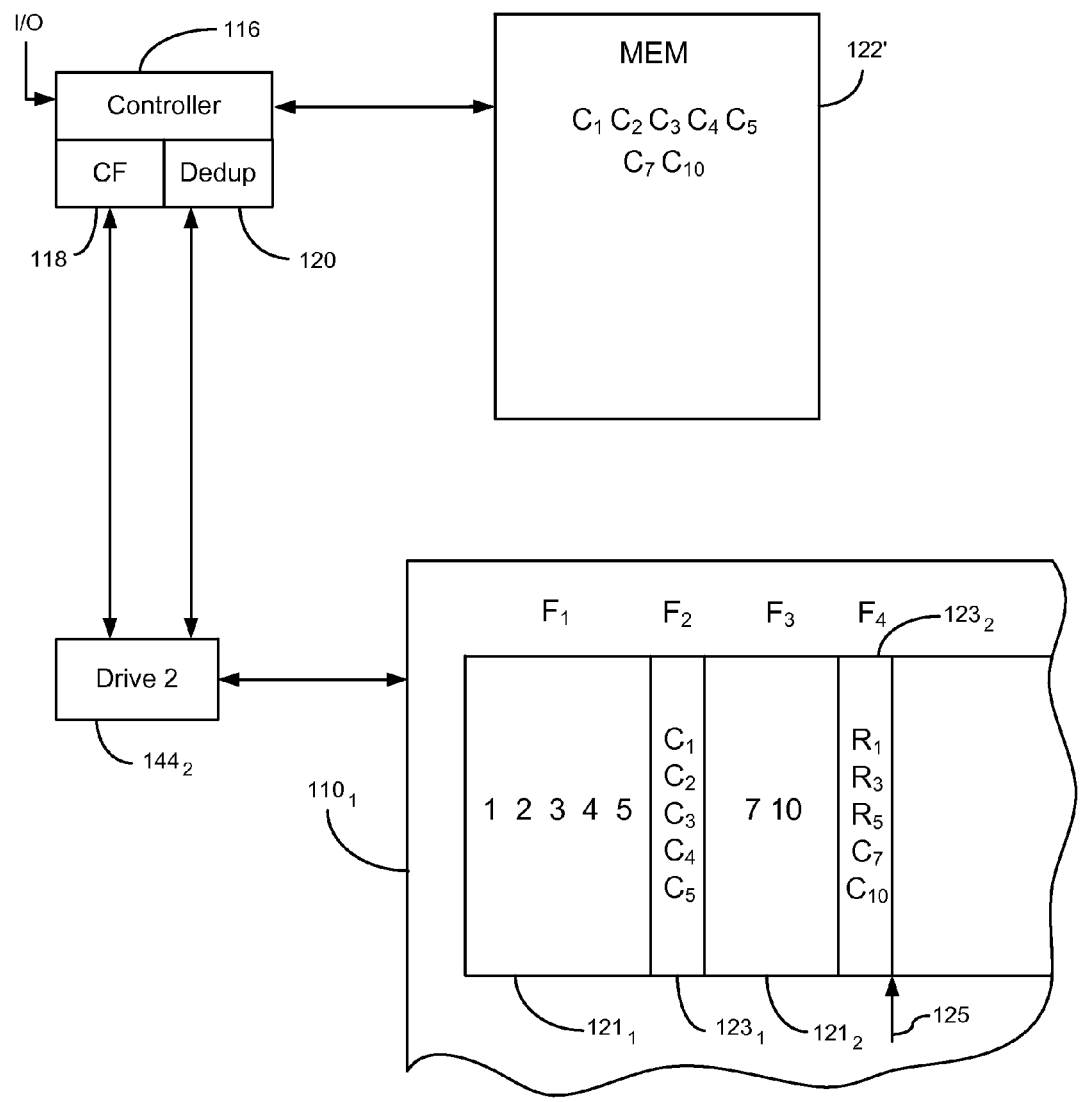
FIG. 12 is similar to FIG. 11 but depicting the controller mounting the tape cartridge to the second tape drive and copying a selected amount of the commonality information from the tape cartridge to the memory before executing any I/O transfers.

FIG. 12 depicts a time after the SD $110_1$ was dismounted in FIG. 11 when the client 102 requires additional I/O transfers with the SD $110_1$. This time the controller 116 directs the SD $110_1$ to be mounted in a different tape drive $144_2$ (Drive 2). It is advantageous for the controller 116 to know what data chunks 128 are already stored on the SD $110_1$, and where those already stored data chunks 128 reside, so that the deduplication pattern described above can be continued for additional I/O transfers with SD $110_1$.

When the SD $110_1$ is mounted to the drive $144_2$, the controller 116 first copies a selected amount of the commonality information files $123_1$, $123_2$, . . . $123_n$ to the memory 122' before executing any I/O transfers. The selected amount may be programmably set anywhere between none to all of the commonality information. For example, the tape may be scrolled to the first file marker, in this example the first user data file $121_1$, and then all of the even-numbered files, in this example the $C_i$ content of all of the commonality information files may be copied to the memory 122'. In this example that results in the controller copying $C_1$ $C_2$ $C_3$ $C_4$ $C_5$ $C_7$ $C_{10}$ to the memory 122'. In alternative embodiments the $C_i$ content of only a portion of the commonality information files may be copied to the memory 122', such as a portion that may be copied within a predetermined interval of time or a portion residing within a predetermined range of the tape.

Figure 13:
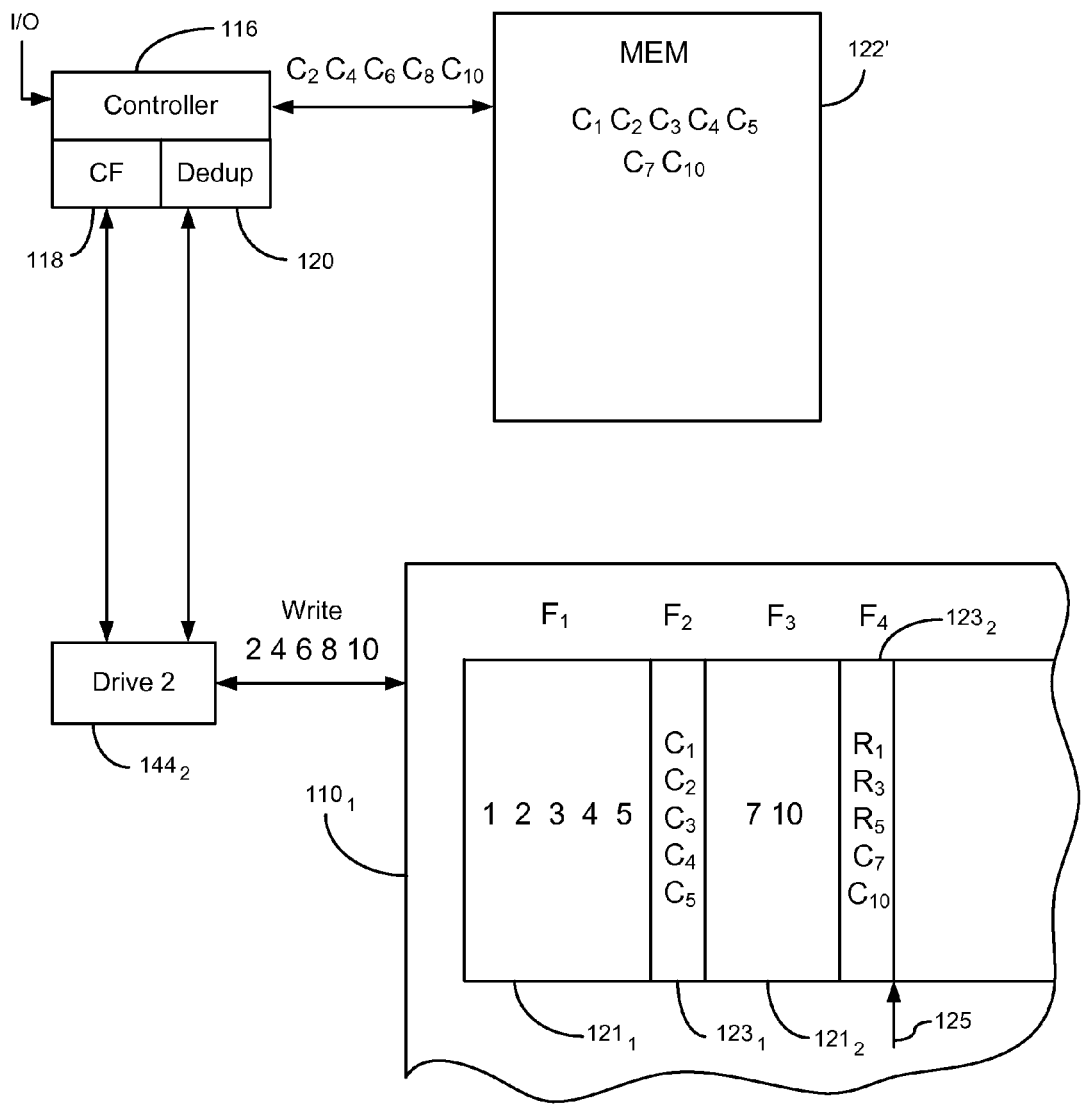
FIG. 13 is similar to FIG. 12 but depicting the controller subsequently executing a write command for data chunks 2 4 6 8 10.
Figure 14:
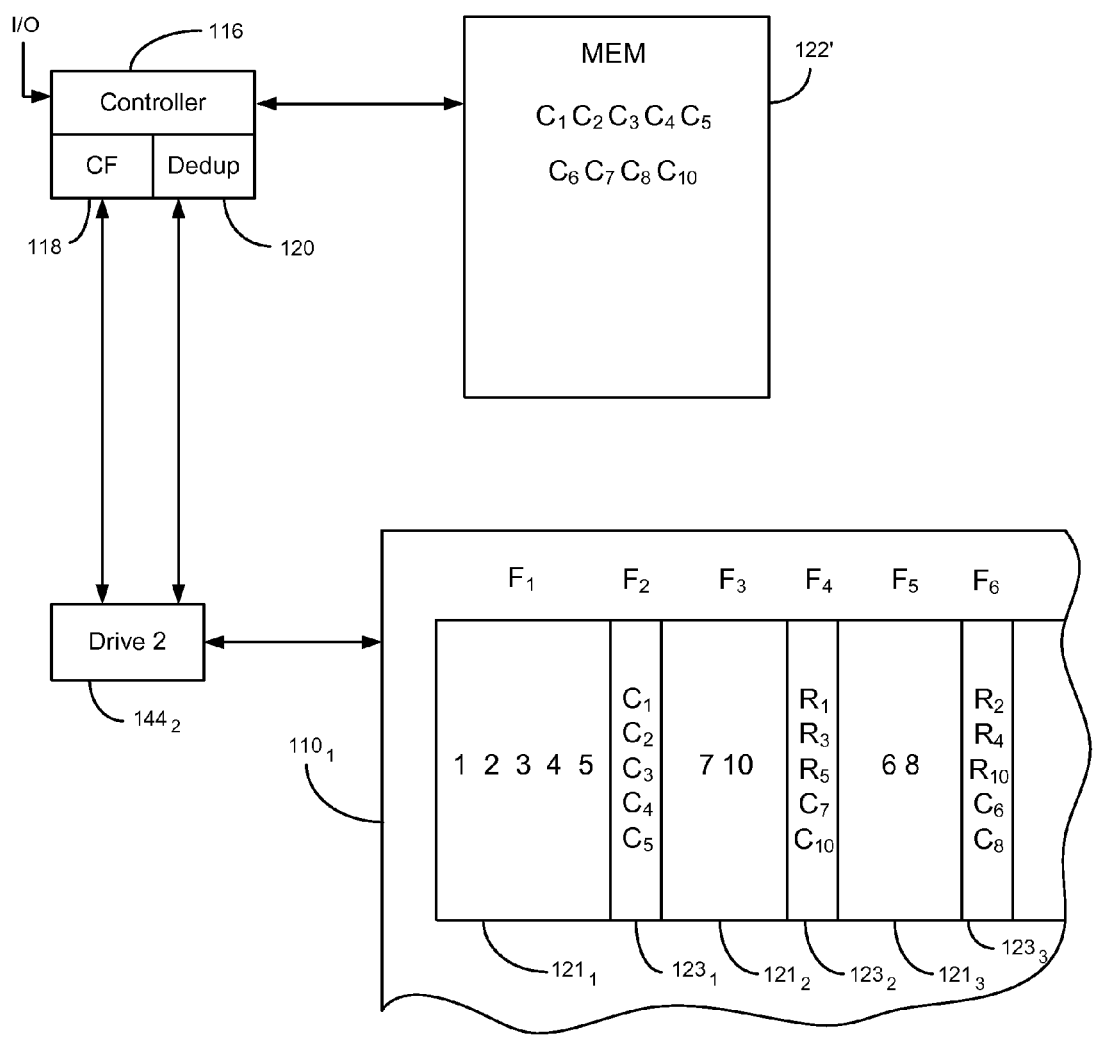
FIG. 14 is similar to FIG. 13 but depicting a time after the write command is completed.

FIG. 13 depicts a time after which the memory 122' is populated as desired, when the controller 116 begins I/O transfers to SD $110_1$ via the drive $144_2$. In continuing this example the controller 116 now executes a write command for 2 4 6 8 10. As described above, the controller 116 searches the memory 122' and gets hits for $C_2$ $C_4$ $C_{10}$, indicating that 2 4 10 are already stored in the SD $110_1$. As depicted in FIG. 14, to avoid duplication the controller 116 writes only 6 8 to the user data file $121_3$ ($F_5$). The controller 116 writes $R_2$ $R_4$ $R_{10}$ and $C_6$ $C_8$ to the third commonality information file $123_3$ ($F_6$) and also writes C6 C8 to the memory 122', all in the same manner described above. In a subsequent read command for F5, $R_2$ for example is structured to inform the controller 116 that 2 resides in the second record of $F_1$.

The memory 122' may be capable of sequentially ordering $C_6$ $C_8$ within the previously stored $C_1$ $C_2$ $C_3$ $C_4$ $C_5$ $C_7$ $C_{10}$, such as by memory shifting operations in a solid state memory. That advantageously positions $C_6$ between the previously stored $C_5$ and $C_7$ and likewise positions $C_8$ between the previously stored $C_7$ and $C_{10}$ in the memory 122'.

Figure 15:
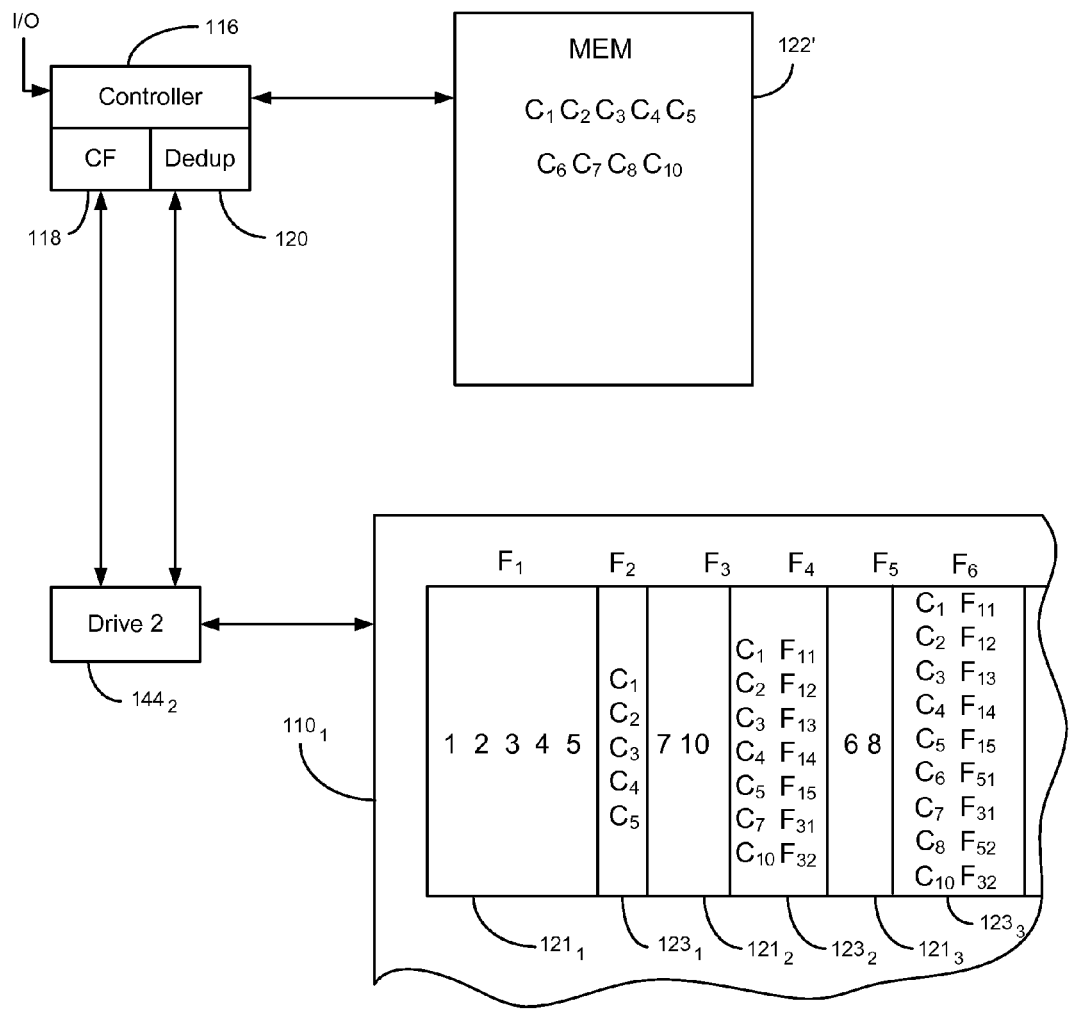
FIG. 15 is similar to FIG. 14 but depicting alternative embodiments that store cumulative commonality information files corresponding to all upstream user data files.

FIG. 15 depicts alternative embodiments for the same I/O execution example above, depicting the same point in time as FIG. 14. However, in FIG. 15 each of the commonality information files $123_1$, $123_2$, $123_3$ . . . $123_n$ contains a cumulative collection of the $C_i$ in all of the upstream user data files $121_1$, $121_2$, $121_3$ . . . $123_{n-1}$. Each $C_i$ is tagged with a synchronization mark $F_{jk}$ identifying where the data chunk 128 resides in one of the upstream user data files $121_1$, $121_2$, $121_3$ . . . $123_{n-1}$. For example, $C_1$ is tagged with $F_{11}$ to form $C_1F_{11}$. In a subsequent read command of $F_3$, the first subscript of $F_{11}$ informs the controller 116 that $C_1$ is stored in $F_1$ (user data file $121_1$). The second subscript of $F_{11}$ informs the controller 116 that $C_1$ is the first record in $F_1$. This advantageously provides the controller 116 an opportunity to upload all of the upstream commonality information from just one commonality information file $123_i$. Ultimately, the commonality information for the entire SD $110_1$ can be uploaded from the last commonality information file $123_n$ in the sequential string. In any event, the entire $C_iF_{jk}$ data structure can be stored in the memory 122' and searched only according to the $C_i$ component, or the $C_iF_{jk}$ data structure can be truncated to store only the $C_i$ component in the memory 122' as in the examples above.

Figure 16:
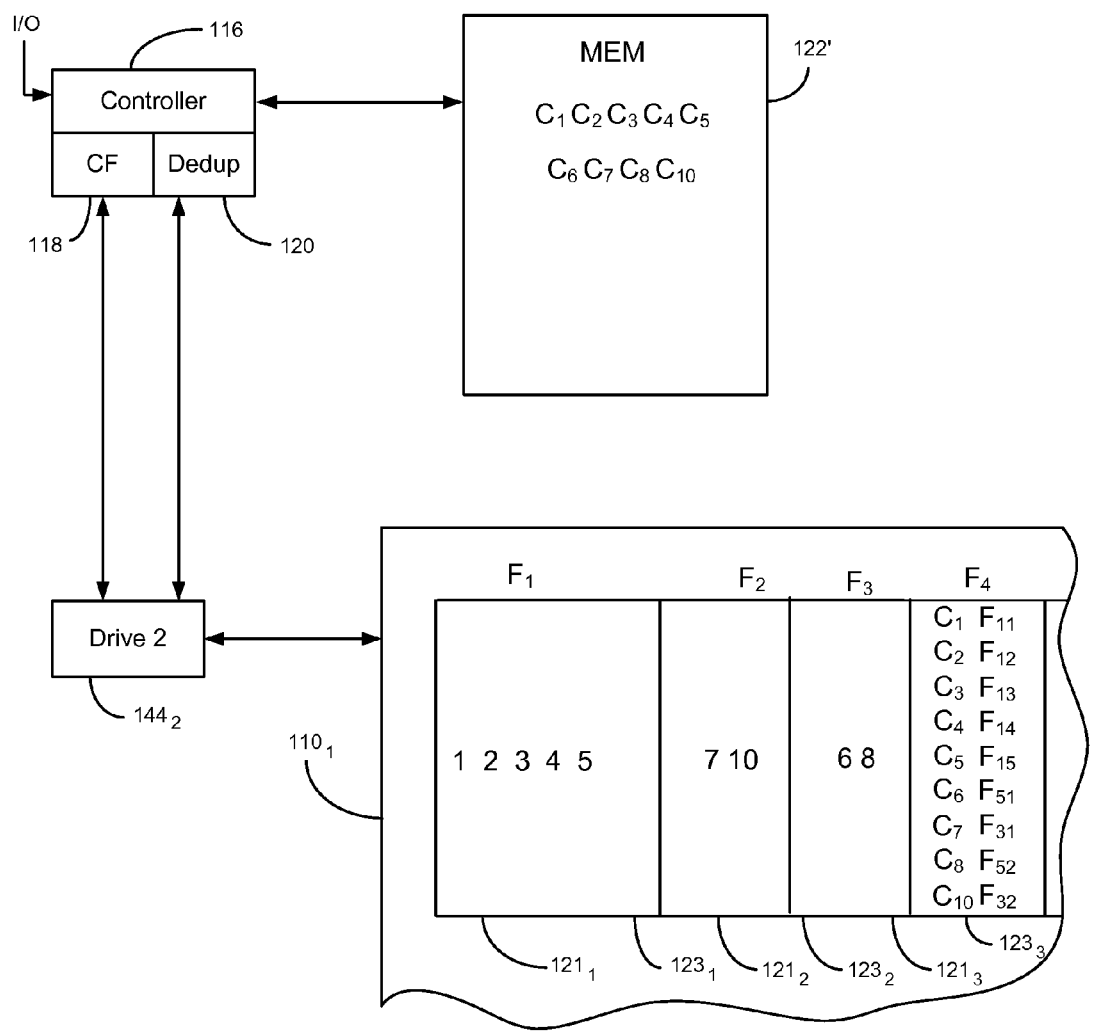
FIG. 16 is similar to FIG. 15 but depicting alternative embodiments that store only one cumulative commonality information file for the entire tape cartridge at the end of the sequential stream.

FIG. 16 depicts other alternative embodiments similar to FIG. 15 except that only one cumulative collection of all $C_i$ resides in the last file, the one and only commonality information file 123, at the end of the sequential string. In this case the contents of the commonality information file 123 is the same as the last commonality information file $123_3$ in FIG. 15. In this case when the controller 116 writes the next user data file 121₄ it will scroll the tape to begin writing at the F₄ file marker. In doing so the controller 116 overwrites the contents of F₄ with the next user data file 121₄.

Figure 17:
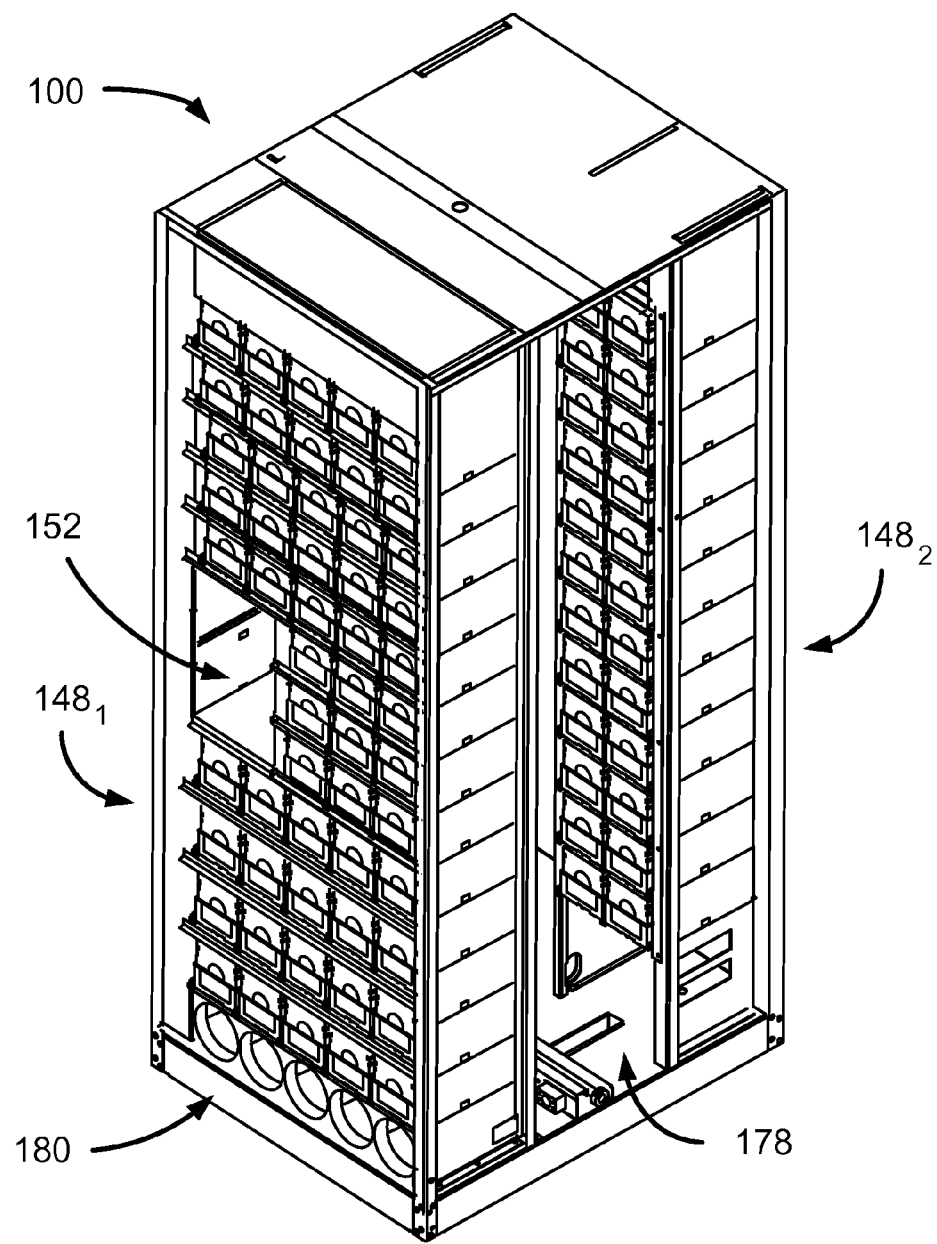
FIG. 17 is an isometric depiction of a portion of a tape library.

Embodiments of the present invention can be commercially practiced in a Spectra Logic T-950 tape cartridge library manufactured by Spectra Logic of Boulder Colo. FIG. 17 shows a commercial embodiment of one T-950 tape library without an enclosure. The T-950 tape library has first and second shelf systems 148₁, 148₂ that support a plurality of the mobile media, such as the magazine 139 holding a plurality of LTO tape cartridges 137 with MAMs, archived by the tape library. The shelf systems 148₁, 148₂ can each have at least one auxiliary memory reader. Disposed next to the second shelf system 148₂ are at least four IBM LTO tape drives 144 to write data to and read data from a tape cartridge 137. The IBM LTO tape drives 144 each have the capability of storing data to an auxiliary radio frequency memory device contained in an LTO tape cartridge 137. Between the first and second shelf systems 148₁, 148₂ is a magazine transport space 178. The magazine transport space 178 provides adequate space for a magazine 139 to be moved, via the transport unit 150 (FIG. 5), from a position in the first shelf system 148₁, for example, to a tape drive 144. The transport unit 150 can further accommodate at least one auxiliary radio frequency memory device reader. Magazines 139 can be transferred into and out from the T-950 tape library via the entry/exit port 152. Transferring magazines 139 in and out of the T-950 tape library can be accomplished by an operator, or by an automated material handling system. The T-950 tape library has cooling fans 180 located in the base. The T-950 tape library can be linked to a central data base to control movement of the auxiliary radio frequency memory devices as indicated by readings from the device readers. The T-950 tape library also includes the library CPU 145 (FIG. 5) providing top-level control and coordination of all processes. The T-950 tape library also provides the graphical user interface 147 (FIG. 5) displaying assessment results or simple messages such as an audible or visual alert accompanying recommendations for further action(s).

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple write commands can be simultaneously interleaved by the data pathway logic in performing the I/O throughput for example, while still maintaining substantially the same functionality without departing from the scope and spirit of the claimed invention. Another example can include using these techniques across multiple libraries, while still maintaining substantially the same functionality without departing from the scope and spirit of the claimed invention. Further, though communication is described herein as between a client and the tape library, communication can be received directly by a tape drive, via the fabric interface 138 for example, without departing from the scope and spirit of the claimed invention. Further, for purposes of illustration, a first and second tape drive and tape cartridges are used herein to simplify the description for a plurality of drives and tape cartridges. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A method comprising:
   providing a data storage system possessing a tape drive, a tape cartridge containing a tape medium, and a commonality factoring module;
   transferring user data from a client to the data storage system via execution of a plurality of input/output transfers;
   determining a first portion and a second portion of the user data;
   performing first commonality factoring to the first portion of the user data to create a first commonality factor and second commonality factoring to the second portion of the user data to create a second commonality factor;
   after the performing step, assigning first commonality information to the first portion of the user data and second commonality information to the second portion of the user data;
   comparing the first commonality factor and the second commonality factor to a database of pre-existing commonality factors;
   establishing the second commonality factor exists in the database of pre-existing commonality factors;
   streaming the first portion of the user data and the second commonality information into a sequential data stream that is devoid of the second portion of the user data; and
   storing the sequential data stream to the tape medium via the tape drive.

* * * * *